No. 856,248. PATENTED JUNE 11, 1907.
W. N. GILBERT.
RAILWAY TRACK SCALE.
APPLICATION FILED JULY 6, 1906.
2 SHEETS—SHEET 1.
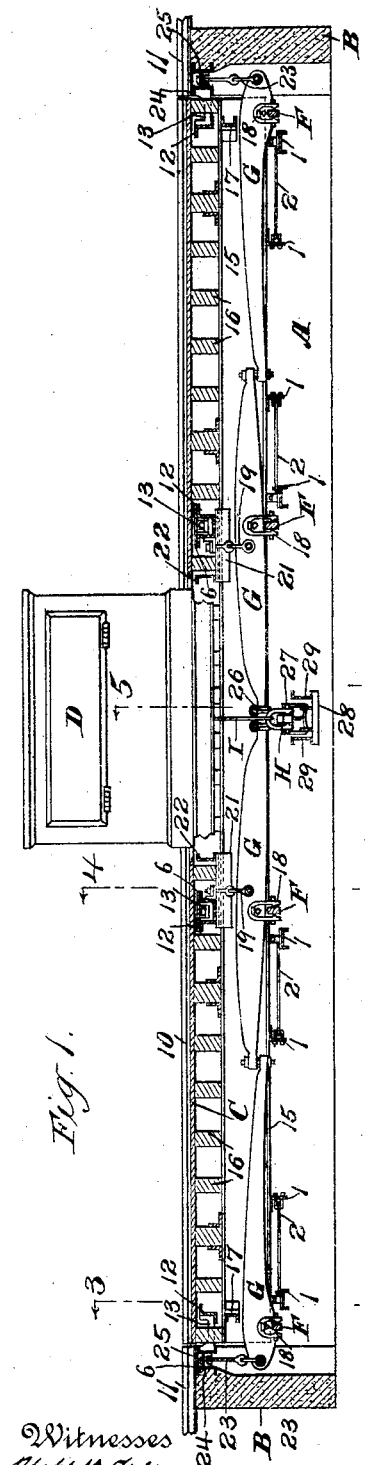
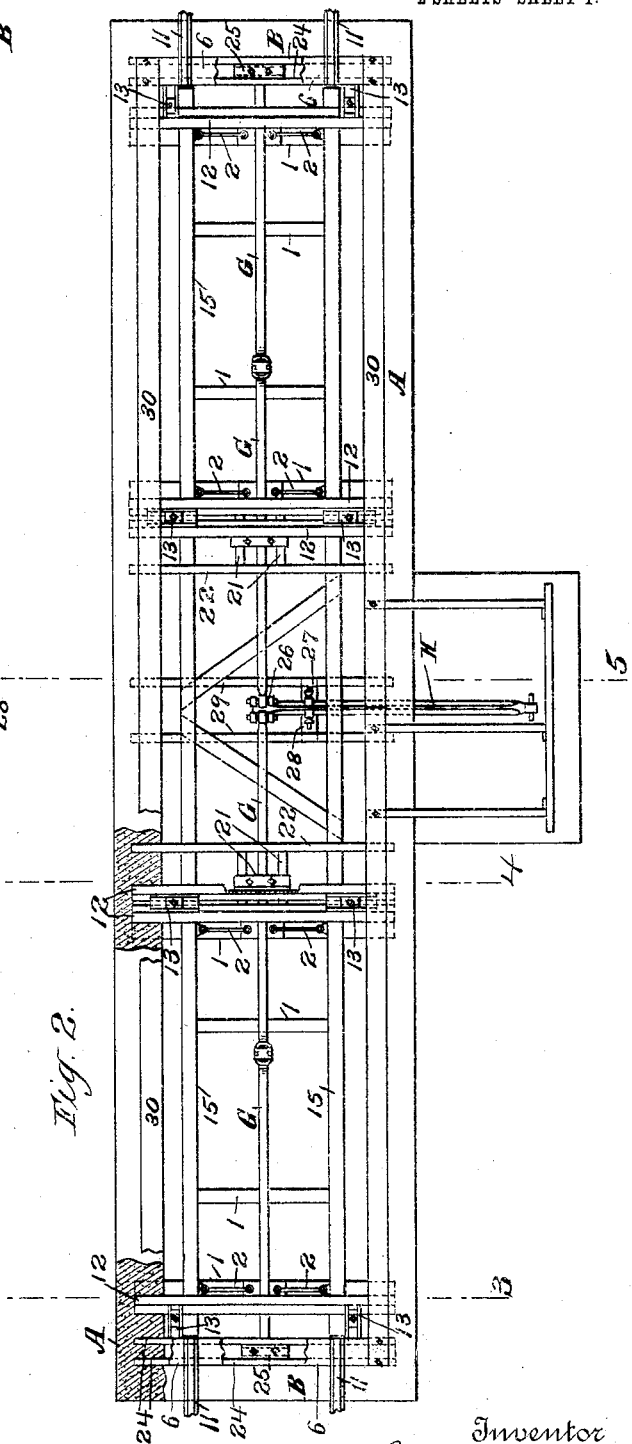

No. 856,248. PATENTED JUNE 11, 1907.
W. N. GILBERT.
RAILWAY TRACK SCALE.
APPLICATION FILED JULY 6, 1906.

2 SHEETS—SHEET 2.

Witnesses
Inventor
William N. Gilbert
By his Attorneys

UNITED STATES PATENT OFFICE.

WILLIAM N. GILBERT, OF BINGHAMTON, NEW YORK, ASSIGNOR TO OSGOOD SCALE COMPANY, OF BINGHAMTON, NEW YORK, A CORPORATION OF NEW YORK.

RAILWAY-TRACK SCALE.

No. 856,248.   Specification of Letters Patent.   Patented June 11, 1907.

Application filed July 6, 1906. Serial No. 324,958.

*To all whom it may concern:*

Be it known that I, WILLIAM N. GILBERT, a citizen of the United States, residing at Binghamton, county of Broome, and State of New York, have invented certain new and useful Improvements in Railway-Track Scales, fully described and represented in the following specification and the accompanying drawings, forming a part of the same.

The especial object of the invention is to provide an improved weighing scale of that class used for weighing railway cars and generally known as railway-track scales, but scales embodying the present invention may be used for other purposes.

The invention includes a novel scale frame construction having cross beams or bars extending between and supported by the side walls, and from which the scale levers are suspended, and various features of construction and combinations of parts, all as fully described hereafter and specifically pointed out in the claims.

Figure 3:
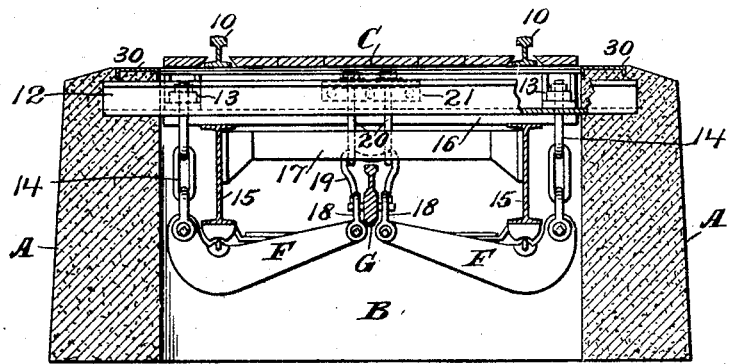
Figure 4:
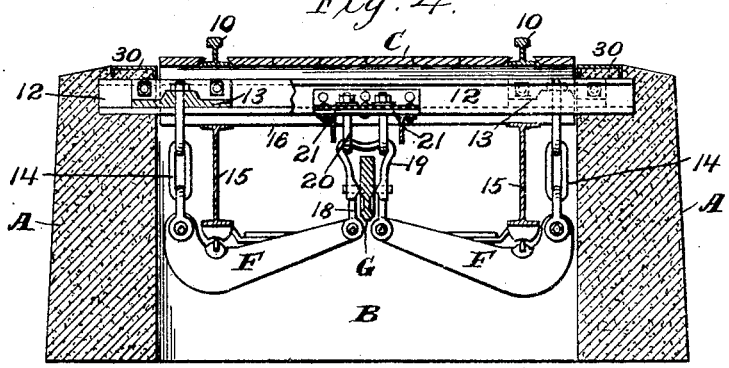
Figure 5:
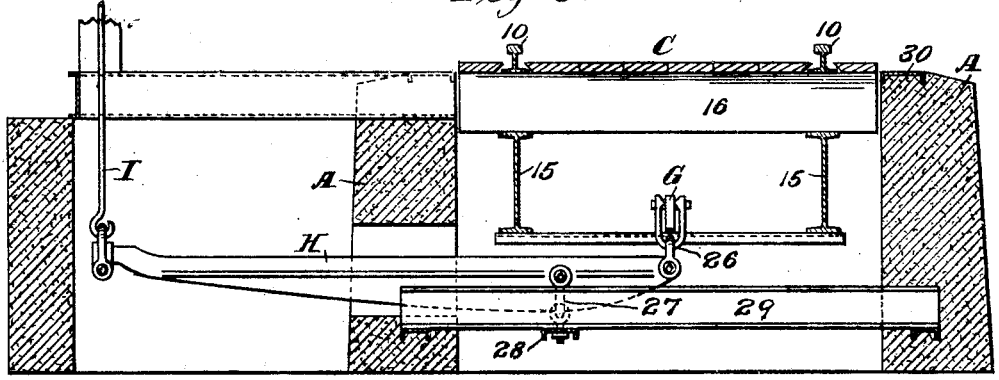

In the accompanying drawings, which show a railway track scale embodying all the features of the invention in their preferred form—Figure 1 is a longitudinal section of the scale. Fig. 2 is a plan view of the same, with one side wall partly broken away and the platform removed, to show the construction. Figs. 3, 4 and 5 are sections on, respectively, the lines 3, 4 and 5 of Figs. 1 and 2.

Referring to the drawings, A are the side walls and B the end walls of the scale pit, C the platform proper carrying the tracks 10 in line with the stationary tracks 11, and D the scale box containing any suitable scale beam devices. The walls A, B forming the pit may be made of concrete, as shown, or of any suitable masonry. Set into the side walls A near the top so as to be supported thereby, are cross beams or bars forming supports for the scale levers. These supports may be of other form, but preferably consist of channel bars, which, for the use of standard forms, may be made, as shown, of two Z-bars 12 placed together, with supporting blocks 13 between them and resting on their lower flanges, from which blocks 13 the main levers are suspended, these main levers F extending transversely to the scale and being suspended from the blocks 13 by links and I-bolts 14 which are adjustable vertically in blocks 13 by nuts, as usual in such suspensions. The supports for the main levers are shown as having only one Z-bar 12, the blocks 13 being supported by the flanges of these Z-bars and the flanges of the pivot supports for the end extension levers, as described below. The main levers F carry the platform beams 15, which consist of two I-beams at opposite sides of the platform, on which are the cross joists 16 supporting the platform C, the I-beams 15 being tied together at intervals by bars 17.

The main levers F are connected centrally of the scale to longitudinal extension levers G, of which four are used in the scale shown, the main levers F being suspended on the extension levers G by pivot loops 18. The inside extension levers G are suspended by crooked loops 19 and two adjustable I-bolts 20 from blocks 21 which are carried by the cross bars 12 and by other cross bars 22 also set into and supported by the side walls A, these bars 22 being shown as channel irons. The end extension levers G are suspended by crooked loops and two adjustable I-bolts 23 from supports 24 extending between and set into the side walls A at the end of the pit, being shown as set also in the end walls B which are provided with recesses for receiving the ends of the levers and the suspensions, the supports 24 being shown as formed of two channel irons supporting blocks 25 from which the levers G are suspended. The blocks 13 for suspending the end levers F are supported at one end by resting on the flange of one of the bars 24. The use of the crooked links 19 to support the extension levers through which the motion of the main levers is transmitted, is important, as these crooked links balance the pressure from opposite sides and preserve the proper position and pivoting of the extension levers. The other features of the invention may be used without this, however.

The end extension levers G are pivoted to the next extension levers, as usual, and the two inner extension levers are connected by pivot loops and crooked loops 26 to the fifth lever H extending transversely to a point below the beam box D and there pivotally connected to the beam rod I. The fifth lever H is pivoted on supporting loop 27, which is carried by block 28 on cross bars 29, which are set into and supported by the side walls A near the bottom of the pit. The supports for the main levers cover these levers and protect them and their pivots from rain, snow and dirt. If these supports be made of bars separated for the passage of the eye bolts, as shown, plates 6 will preferably be used to cover them. Similar cover plates 6 are preferably used on the bars 24 to protect the pivots of the end extension levers.

The side walls A are preferably protected against wear and breakage of the edges by channel irons 30 set into the tops of the walls, but it will be understood that this is not essential to the invention. In the construction shown, also, check bars 1 and both transverse and longitudinal check rods 2 are illustrated, but these are not essential to the invention, although preferably used.

The suspension of the scale levers from cross supports extending between the side walls secures many important advantages. Practically the full depth of the pit walls is used for support, so that great foundation strength is secured with the same or less pit depth. The parts in contact with the wall, also, are in the upper part of the pit, so that water is less liable to reach them from below or collect on them from the pit walls, which water would flow in on the supports and reach the bearings. With these cross supports at the top of the pit, also, they can readily be replaced in case of breakage without much cutting of the walls, and the levers can readily be adjusted from the top without going into the pit. The construction, also, avoids the use of chairs for the extension levers, and permits the main and extension levers to be adjusted from above independently of each other, and without disturbing the centers or blocking up from the chairs, which is the case when the extension levers are supported by foundation chairs. Moreover, the high supports and suspension of the levers below them, avoids the danger of snow accumulating upon the supports and interfering with the levers, any snow or rain passing through the platform or between the edges of the platform and walls falling to the bottom of the pit. The cross supports may be set into concrete walls as deeply as desired, even to the full thickness of the walls, a strong support thus being secured and the liability to breaking down the concrete, which exists when the levers are supported by plates extending along the edge of the concrete, being avoided.

In addition to the above important advantages, the invention provides a very simple compact and efficient railway-track scale, convenient in adjustment, and which may be used with a pit requiring less concrete than other railway-track scales not employing the cross supports.

It will be understood that the invention is not limited to the specific construction illustrated, but that the specific form and arrangement of the framing, levers and other parts shown may be varied while retaining the invention defined by the claims.

What I claim is:—

1. In a weighing scale having longitudinal and side walls forming a scale pit, the combination with supports extending across the scale and supported at their ends by the side walls, of main levers supporting the scale platform, and extension levers extending longitudinally of the scale through which the motion of the main levers is transmitted, said main and extension levers being suspended from and below said supports.

2. In a weighing scale having longitudinal and side walls forming a scale pit, the combination with supports extending across the scale and supported at their ends by the side walls, of main levers supporting the scale platform and extending from opposite sides of the scale to the center, and central extension levers extending longitudinally of the scale and through which the motion of the main levers is transmitted, said main and extension levers being suspended from and below said supports.

3. In a weighing scale having longitudinal and side walls forming a scale pit, the combination with supports extending across the scale and supported at their ends by the side walls, of main levers supporting the scale platform, extension levers extending longitudinally of the scale and through which the motion of the main levers is transmitted, said main and extension levers being suspended from and below said supports, and suspension devices for said main and extension levers by which the main and extension levers may be adjusted independently of each other.

4. In a weighing scale having longitudinal and side walls forming a scale pit, the combination with supports extending across the scale and supported at their ends by the side walls, of levers supporting the scale platform and suspended from and below said supports.

5. In a weighing scale having longitudinal and side walls forming a scale pit, the combination with supports extending across the scale and supported at their ends by the side walls, of main levers supporting the scale platform, and extension levers extending longitudinally of the scale through which the motion of the main levers is transmitted, said extension levers being suspended from and below said supports.

6. In a weighing scale having longitudinal and side walls forming a scale pit, the combination with supports extending across the scale and supported at their ends by the side walls, of main levers supporting the scale platform and extending from opposite sides of the scale to the center, and central extension levers extending longitudinally of the scale and through which the motion of the main levers is transmitted, said extension levers being suspended from and below said supports.

7. In a weighing scale, the combination with the platform and the main levers supporting the platform, of extension levers through which the motion of the main levers is transmitted, supports below the scale platform and above the extension levers, and means for pivotally suspending said extension levers from and below said supports.

In testimony whereof, I have hereunto set my hand, in the presence of two subscribing witnesses.

WILLIAM N. GILBERT.

Witnesses:
JOHN A. BROWN,
WM. BURTON WEBSTER, Jr.